United States Patent
Liu et al.

(10) Patent No.: US 11,473,625 B2
(45) Date of Patent: Oct. 18, 2022

(54) LIQUID INJECTION RING AND REFRIGERANT LUBRICATED BEARING ASSEMBLY

(71) Applicant: Gree Electric Appliances, Inc. of Zhuhai, Guangdong (CN)

(72) Inventors: Hua Liu, Guangdong (CN); Zhiping Zhang, Guangdong (CN); Hongbo Li, Guangdong (CN); Nan Jiang, Guangdong (CN)

(73) Assignee: Gree Electric Appliances, Inc. of Zhuhai, Guangdong (CN)

(*) Notice: Subject to any disclaimer, the term of this patent is extended or adjusted under 35 U.S.C. 154(b) by 0 days.

(21) Appl. No.: 17/261,196

(22) PCT Filed: Dec. 19, 2018

(86) PCT No.: PCT/CN2018/121878
§ 371 (c)(1),
(2) Date: Jan. 19, 2021

(87) PCT Pub. No.: WO2020/052141
PCT Pub. Date: Mar. 19, 2020

(65) Prior Publication Data
US 2021/0270321 A1  Sep. 2, 2021

(30) Foreign Application Priority Data
Sep. 14, 2018 (CN) .......................... 201811071910.3

(51) Int. Cl.
*F16C 33/66* (2006.01)
*F16C 37/00* (2006.01)
(Continued)

(52) U.S. Cl.
CPC ...... *F16C 33/6692* (2013.01); *F04B 39/0215* (2013.01); *F04B 39/0284* (2013.01);
(Continued)

(58) Field of Classification Search
CPC ...... F16C 19/54; F16C 19/541; F16C 19/546; F16C 33/6659; F16C 33/6662;
(Continued)

(56) References Cited

U.S. PATENT DOCUMENTS

| 3,531,167 A | 9/1970 | Edge et al. |
| 7,819,587 B2 | 10/2010 | Akamatsu et al. |
| 2002/0048517 A1 | 4/2002 | Sugita et al. |
| 2015/0226266 A1* | 8/2015 | Mori .................... B23Q 11/123 384/467 |

FOREIGN PATENT DOCUMENTS

| CN | 205025807 U | 2/2016 |
| CN | 106340995 A | 1/2017 |

(Continued)

OTHER PUBLICATIONS

Machine Translation of CN 205025807 (Year: 2016).*
Machine Translation of JP 2010-007726 (Year: 2010).*

*Primary Examiner* — Alan B Waits
(74) *Attorney, Agent, or Firm* — The Webb Law Firm

(57) ABSTRACT

The present application relates to a liquid injection ring and a refrigerant lubricated bearing assembly, the liquid injection ring includes a ring body; the ring body is provided with a liquid storage chamber and a plurality of liquid guide holes; the liquid storage chamber is arranged in a circle around the axis of the ring body; the inlets of the liquid guide holes communicate with the liquid storage chamber; the outlets of the liquid guide holes face the end surface of a to-be-lubricated bearing; and the plurality of liquid guide holes are uniformly distributed in a spaced manner along the circumferential direction of the ring body.

9 Claims, 2 Drawing Sheets

(51) Int. Cl.
  *F04B 39/02* (2006.01)
  *F04B 53/18* (2006.01)
  *F16N 7/34* (2006.01)

(52) U.S. Cl.
  CPC .......... *F04B 53/18* (2013.01); *F16C 33/6659* (2013.01); *F16C 33/6674* (2013.01); *F16C 37/007* (2013.01); *F16N 7/34* (2013.01); *F16C 2360/00* (2013.01); *F16N 2210/14* (2013.01)

(58) Field of Classification Search
  CPC .............. F16C 33/6674; F16C 33/6677; F16C 33/6692; F16C 37/00; F16C 37/007; F16C 2360/00; F04B 39/0215; F04B 39/0284; F04B 53/18; F16N 7/34; F16N 2210/14
  See application file for complete search history.

(56) References Cited

FOREIGN PATENT DOCUMENTS

| | | | | |
|---|---|---|---|---|
| CN | 105317672 | B | 8/2017 | |
| CN | 207568805 | U | 7/2018 | |
| DE | 112005002608 | T5 | 9/2007 | |
| EP | 0769630 | A2 | 4/1997 | |
| EP | 0864751 | A2 | 9/1998 | |
| EP | 1197702 | A1 | 4/2002 | |
| EP | 1471275 | A2 | 10/2004 | |
| EP | 3273076 | A1 | 1/2018 | |
| GB | 762293 | | 11/1956 | |
| JP | 2010007726 | A * | 1/2010 | .............. F16C 19/54 |
| JP | 201396465 | A | 5/2013 | |
| JP | 201462619 | A | 4/2014 | |

* cited by examiner

LIQUID INJECTION RING AND REFRIGERANT LUBRICATED BEARING ASSEMBLY

CROSS-REFERENCE TO RELATED APPLICATIONS

This application is the United States national phase of International Application No. PCT/CN2018/121878 filed Dec. 19, 2018, and claims priority to Chinese Patent Application No. 201811071910.3 filed Sep. 14, 2018, the disclosures of which are hereby incorporated by reference in their entirety.

BACKGROUND OF THE INVENTION

Field of the Invention

The present application relates to the field of bearing lubrication, in particular to a liquid injection ring and a refrigerant lubricated bearing assembly.

Description of Related Art

During the operation of a compressor, a rotor needs to rotate at a high speed, and a bearing is mainly used to support the rotor. Therefore, relative rotation between the inner ring and the outer ring of the bearing is required during use, and the rotation speed will increase due to the increase of the rotation speed of the rotor. Accordingly, the bearing needs to be lubricated and refrigerated to ensure that the bearing is in a state of efficient use. Bearings are generally divided into oil lubricated bearings, magnetic bearings, air bearings, etc. Since there is no direct contact between the magnetic bearings and the air bearings, oil lubrication is not required. However, the magnetic bearings and the air bearings have relatively high requirements on the operating environment as well as relatively high manufacturing costs. While the oil lubricated bearings are low in cost, simple in structure, relatively high in reliability, and relatively wide in application. Generally, oil lubricated bearings are lubricated by lubricating oil, and exchange heat by refrigerants. However, the mixed lubricating oil and refrigerant needs to be separated and purified by additional equipment, and if the refrigerant is mixed with lubricating oil, it will have a relatively great impact on the heat exchange performance of the refrigerant. Based on this, it was found that if the refrigerant has a certain viscosity, it can be used as a lubricating fluid for refrigerating as well as lubricating the bearing. But generally, the effect of using a refrigerant for lubrication is poor.

SUMMARY OF THE INVENTION

Based on this, it is necessary to provide a liquid injection ring and a refrigerant lubricated bearing assembly to improve the lubrication effect of the refrigerant.

A liquid injection ring, comprising a ring body, wherein the ring body is provided with a liquid storage chamber and a plurality of liquid guide holes; the liquid storage chamber is arranged in a circle around the axis of the ring body; the inlets of the liquid guide holes communicate with the liquid storage chamber; the outlets of the liquid guide holes face the end surface of a to-be-lubricated bearing; and the plurality of liquid guide holes are uniformly distributed in a spaced manner along the circumferential direction of the ring body.

The above-mentioned solution provides a liquid injection ring; the liquid storage chamber is arranged in a circle around the axis of the ring body and communicates with each liquid guide hole, the refrigerant is dispersed into each liquid guide hole through the liquid storage chamber, and the plurality of liquid guide holes are uniformly distributed in a spaced manner along the circumferential direction of the ring body, so that the liquid injection ring can implement uniform liquid injection on the to-be-lubricated bearing, thereby improving the lubrication effect. Specifically, the liquid storage chamber arranged in a circle around the axis of the ring body is used to conduct the refrigerant into the liquid guide holes which are uniformly distributed in a spaced manner to achieve relatively high consistency of a liquid supply process of each liquid guide hole, thereby improving the uniformity of lubrication.

In one of the embodiments, the liquid storage chamber is an annular groove which is formed in the outer side surface of the ring body in a way or digging.

In one of the embodiments, there are 4-8 liquid guide holes.

In one of the embodiments, the liquid guide holes include transition holes and liquid injection holes that communicate with each other; the transition holes are in communication with the liquid storage chamber; a plurality of transition holes are uniformly distributed in a spaced manner along the circumferential direction of the ring body; the outlets of the liquid injection holes face the end surface of the to-be-lubricated bearing; a plurality of liquid injection holes are uniformly distributed in a spaced manner along the circumferential direction of the ring body; and the diameter of the plurality of liquid injection holes is smaller than that of the transition holes.

In one of the embodiments, each liquid injection hole penetrates through the ring body and forms outlets respectively in two end faces of the ring body, and the outlets of the liquid injection holes located in the same end face of the ring body are uniformly distributed in a spaced manner along the circumferential direction of the ring body.

In one of the embodiments, the volume of the liquid storage chamber is greater than or equal to the sum of the volumes of all transition holes and all liquid injection holes, and the volume of each transition hole is greater than or equal to that of the corresponding liquid injection hole.

A refrigerant lubricated bearing assembly, comprising a transmission shaft, a bearing and the above-mentioned liquid injection ring, wherein the bearing and the ring body both are sleeved on the transmission shaft; the end surface of the ring body abuts against the end surface of the bearing; and the outlets of the liquid guide holes face the bearing.

The refrigerant lubricated bearing assembly provided by the above-mentioned solution adopts the liquid injection ring described in any of the above-mentioned embodiments to ensure that the refrigerant sprayed on the bearing through the liquid injection ring is more uniform, thereby improving the lubrication effect of the refrigerant on the bearing. Specifically, during use, the bearing and the liquid injection ring both sleeve the transmission shaft, and the refrigerant is introduced through the liquid storage chamber on the ring body and is uniformly sprayed on the bearing after passing through the liquid guide holes. Based on the fact that the liquid storage chamber is arranged in a circle around the axis of the ring body, and the liquid guide holes which are uniformly distributed in a spaced manner are all in communication with the liquid storage chamber, the consistency of the liquid discharge processes of the refrigerant in all liquid guide holes is relatively high during conduction, so that the uniformity of lubrication is relatively high, thereby achieving a relatively good lubrication effect on the bearing.

In one of the embodiments, there are two bearings that are respectively located at the two sides of the ring body; the ring body is clamped between the two bearings; the outlets of some liquid guide holes face the end face of one bearing; the outlets of the other liquid guide holes face the end surface of the other bearing; and the liquid guide holes corresponding to the same bearing are uniformly distributed in a spaced manner along the circumferential direction of the ring body.

In one of the embodiments, the refrigerant lubricated bearing assembly further comprises a bearing support that is sleeved on the periphery of the bearing and the liquid injection ring and abuts against the outer side surface of the bearing; the bearing support is provided with liquid inlets communicating with the environment, and the liquid inlets communicate with the liquid storage chamber.

In one of the embodiments, there are a plurality of liquid inlets.

In one of the embodiments, the refrigerant lubricated bearing assembly further comprises an end cover; the end cover is sleeved on the transmission shaft and is spaced from the transmission shaft; the bearing support is axially divided into a first section and a second section; the aperture of the first section is larger than that of the second section; the inner diameter of the end cover is smaller than that of the first section; the end face of the end cover is connected with the end face of the first section to form a clamping space for fixing the ring body and the bearing; the ring body and the bearing that abut against each other are installed inside the clamping space; the inner side surface of the first section abuts against the outer side surface of the bearing; and the second section and the transmission shaft are arranged in a spaced manner.

In one of the embodiments, the bearing is a deep groove ball bearing; the inner side surface of the bearing support abuts against the outer side surface of the ring body; the liquid inlets are arranged corresponding to the liquid storage chamber; the ring body and the transmission shaft are arranged in a spaced manner; the end surface of the ring body abuts against the outer ring of the bearing; and the ring body and the inner ring of the bearing are arranged in a spaced manner.

BRIEF DESCRIPTION OF THE DRAWINGS

Hereinafter, embodiments of the liquid injection ring and the refrigerant lubricating bearing assembly of the present application will be described with reference to the drawings. In the drawings.

DETAILED DESCRIPTION OF THE INVENTION

Figure 1:
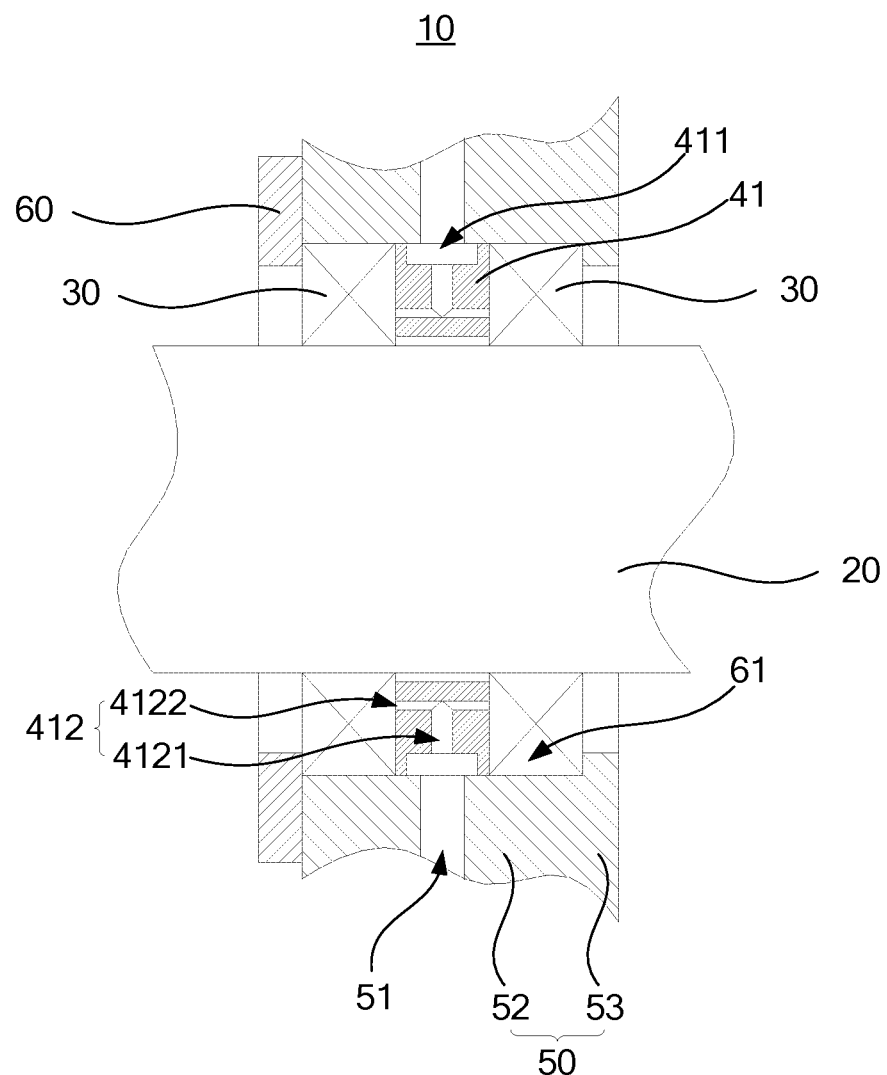
FIG. 1 is a schematic diagram of the structure of the refrigerant lubricated bearing assembly of this embodiment.
Figure 2:
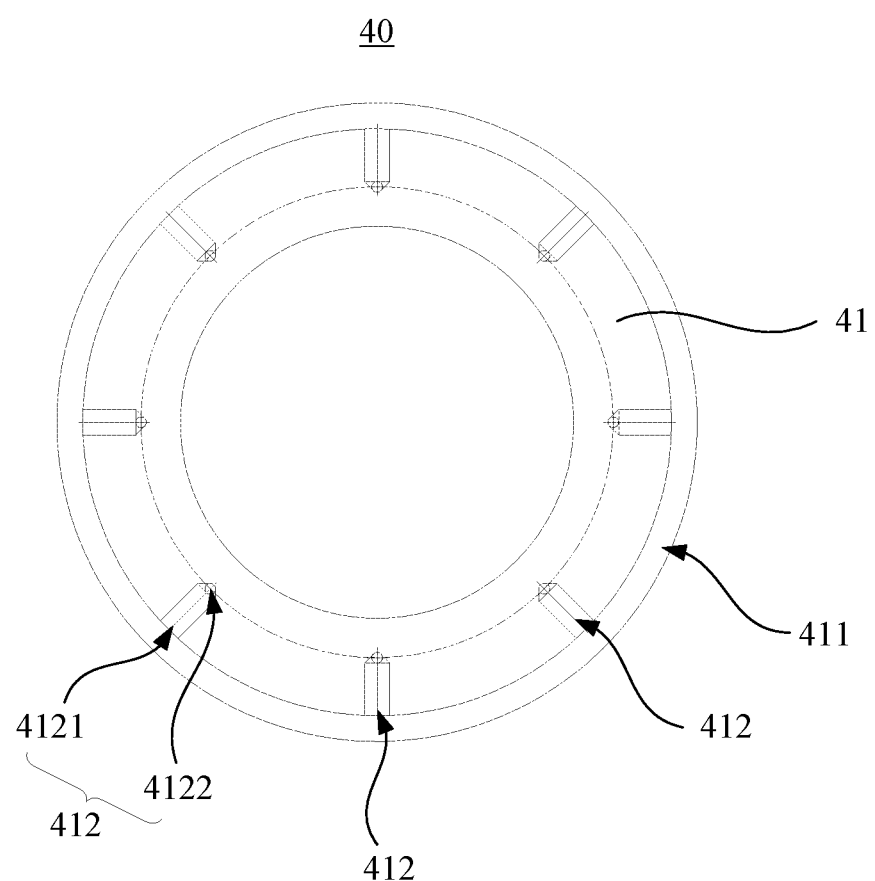
FIG. 2 is a schematic diagram of the structure of the liquid injection ring of this embodiment.

As shown in FIG. 1 and FIG. 2, a liquid injection ring 40 is provided in one embodiment, comprising a ring body 41, the ring body 41 is provided with a liquid storage chamber 411 and a plurality of liquid guide holes 412; the liquid storage chamber 411 is arranged in a circle around the axis of the ring body 41; the inlets of the liquid guide holes 412 communicate with the liquid storage chamber 411; the outlets of the liquid guide holes 412 face the end surface of a to-be-lubricated bearing 30; and the plurality of liquid guide holes 412 are uniformly distributed in a spaced manner along the circumferential direction of the ring body 41.

The above-mentioned embodiment provides a liquid injection ring 40; and the liquid storage chamber 411 is arranged in a circle around the axis of the ring body 41 and communicates with each liquid guide hole 412, the refrigerant is dispersed into each liquid guide hole 412 through the liquid storage chamber 411, and the plurality of liquid guide holes 412 are uniformly distributed in a spaced manner along the circumferential direction of the ring body 41, so that the liquid injection ring 40 may implement uniform liquid injection on the to-be-lubricated bearing 30, thereby improving the lubrication effect. Specifically, the liquid storage chamber 411 arranged in a circle around the axis of the ring body 41 is used to conduct the refrigerant into the liquid guide holes 412 which are uniformly distributed in a spaced manner to achieve relatively high consistency of a liquid supply process of each liquid guide hole 412, thereby improving the uniformity of lubrication.

Specifically, as shown in FIG. 2, in one embodiment, the liquid guide holes 412 are uniformly distributed in a spaced manner along the circumferential direction of the ring body 41, and each liquid guide hole 412 is in communication with the liquid storage chamber 411. Namely, the inlets, communicating with the liquid storage chamber 411, of all liquid guide holes 412 are uniformly distributed in a spaced manner along the axial direction of the ring body 41, and the liquid supply processes of all liquid guide holes 412 substantially keeps consistent during use, thereby further improving the uniformity of lubrication.

Further, in the above-mentioned solution, the liquid storage chamber 411 is arranged in a circle around the axis of the ring body 41, in order to meet the requirement that each liquid guide hole 412 may communicate with the liquid storage chamber 411, so that the liquid supply processes of all liquid guide holes 412 are relatively high in consistency. Specifically, the liquid storage chamber 411 may be an annular groove formed in the outer side surface of the ring body 41 in a way of digging, or may be a chamber arranged in the ring body 41, and both fall within the scope of the forementioned embodiment as long as the refrigerant may be stored in the chamber and may be introduced into each liquid guide hole 412.

In one of the embodiments, as shown in FIG. 1 and FIG. 2, the liquid storage chamber 411 is an annular groove which is formed in the outer side surface of the ring body 41 in a way of digging. Therefore, the annular groove may conveniently communicate with external channels for introducing the refrigerant. For example, when the bearing support 50 for supporting the bearing 30 abuts against the outer side surface of the ring body 41, as shown in FIG. 1, the bearing support 50 is provided with liquid inlets 51 communicating with the liquid storage chamber 411, and by arranging the liquid storage chamber 411 as an annular groove, the liquid inlets 51 may easily communicate with the annular groove and are simple in structure.

Further, in one of the embodiments, as shown in FIG. 2, them are 4-8 liquid guide holes. In view of relatively low viscosity of the refrigerant, a reasonable design is required when arranging the liquid guide holes 412, too many liquid guide holes 412 will cause increment of the processing cost, but too few liquid guide holes 412 cannot guarantee a good lubrication effect. However, by arranging 4-8 liquid guide holes that are uniformly distributed in a spaced manner along the circumferential direction of the ring body 41, the lubrication effect is guaranteed, and the manufacturing cost is reasonably controlled as well.

Specifically, in one embodiment, as shown in FIG. 1 and FIG. 2, the liquid guide holes 412 include transition holes 4121 and liquid injection holes 4122 that communicate with each other; the transition holes 4121 are in communication with the liquid storage chamber 411; a plurality of transition holes 4121 are uniformly distributed in a spaced manner along the circumferential direction of the ring body 41; the outlets of the liquid injection holes 4122 face the end surface of the to-be-lubricated bearing 30; and a plurality of liquid injection holes 4122 are uniformly distributed in a spaced manner along the circumferential direction of the ring body 41.

During use, the refrigerant in the liquid storage cavity 411 first passes through the transition holes 4121, and then is sprayed onto the to-be-lubricated bearing 30 through the liquid injection holes 4122. A plurality of transition holes 4121 are uniformly distributed in a spaced manner along the circumferential direction of the ring body 41, and a plurality of liquid injection holes 4122 are uniformly distributed in a spaced manner along the circumferential direction of the ring body 41, in this way, the liquid injection processes of all liquid injection holes 4122 are consistent during use, and the uniformity of lubrication of the bearing 30 is relatively high.

Specifically, the axis of each transition hole 4121 is arranged along the radial direction of the ring body 41, and the axis of each liquid injection hole 4122 is arranged along the axial direction of the ring body 41, so the structure is simple. Optionally, the axes of the transition holes 4121 and the liquid injection holes 4122 may also be inclined as long as each transition hole 4121 is in communication with the corresponding liquid injection hole 4122, and the outlet of each liquid injection hole 4122 faces the to-be-lubricated bearing 30.

Optionally, each liquid guide hole 412 may also be formed by a through hole, or may consist of transition hole 4121 and a liquid injection hole 4122. Moreover, as shown in FIG. 1, the diameter of the liquid injection holes 4122 is smaller than that of the transition holes 4121, so that when the refrigerant passes through the transition holes 4121 and the liquid injection holes 4122 sequentially, the injection speed is relatively high, and the lubrication effect is better.

Further, in one embodiment, as shown in FIG. 1, each liquid injection hole 4122 penetrates through the ring body 41 and forms outlets respectively in two end faces of the ring body 41, and the outlets of the liquid injection holes 4122 located in the same end face of the ring body 41 are uniformly distributed in a spaced manner along the circumferential direction of the ring body 41.

By arranging the liquid injection holes 4122 in a manner of penetrating through the ring body 41, if the two sides of the liquid injection ring 40 are each provided with the to-be-lubricated bearing 30 during use, the two bearings 30 can be lubricated simultaneously, thus widening the application range.

Further, in one embodiment, as shown in FIG. 1 and FIG. 2, the volume of the liquid storage chamber 411 is greater than or equal to the sum of the volumes of all transition holes 4121 and all liquid injection holes 4122, and the volume of each transition hole 4121 is greater than or equal to that of the corresponding liquid injection hole 4122. Therefore, during use, each liquid injection hole 4122 is ensured to be filled with the refrigerant to avoid the presence of air in the refrigerant, thereby preventing influences on the lubrication effect.

Further, as shown in FIG. 1, a refrigerant lubricated bearing assembly 10 is provided in another embodiment, and comprises a transmission shaft 20, a bearing 30 and the above-mentioned liquid injection ring 40, wherein the bearing 30 and the ring body 41 both sleeve the transmission shaft 20; the end surface of the ring body 41 abuts against the end surface of the bearing 30; and the outlets of the liquid guide holes 412 face the bearing 30.

The refrigerant lubricated bearing assembly 10 provided by the above-mentioned solution adopts the liquid injection ring 40 described in any of the above-mentioned embodiments to ensure that the refrigerant sprayed on the bearing 30 through the liquid injection ring 40 is more uniform, thereby improving the lubrication effect of the refrigerant on the bearing 30. Specifically, during use, the bearing 30 and the liquid injection ring 40 both sleeve the transmission shaft 20, and the refrigerant is introduced through the liquid storage chamber 411 on the ring body 41 and is uniformly sprayed on the bearing 30 after passing through the liquid guide holes 412. Based on the fact that the liquid storage chamber 411 is arranged in a circle around the axis of the ring body 41, and the liquid guide holes 412 that are uniformly distributed in a spaced manner are all in communication with the liquid storage chamber 411, the consistency of the liquid discharge processes of the refrigerant in all liquid guide holes 412 is relatively high during conduction, so that the uniformity of lubrication is relatively high, thereby achieving a relatively good lubrication effect on the bearing 30.

Moreover, specifically, during the use of the liquid injection ring 40 described herein, the refrigerant sprayed onto the bearing 30 may be used to lubricate as well as refrigerate the bearing 30. With increment of the amount of introduced refrigerant, the deposited refrigerant flows out from the axial direction of the transmission shaft 20, and new refrigerant may be continuously sprayed on the bearing 30.

Specifically, the abutment between the end surface of the ring body 41 and the end surface of the bearing 30 described herein may be direct-contact abutment, or abutment realized through an intermediate element. For example, an annular gasket is arranged between the ring body 41 and the bearing 30, and the ring body 41 abuts against the bearing 30 through the annular gasket, which also falls within abutment range described in the forementioned solution. Moreover, the abutment between the ring body 41 and the bearing 30 may also achieve a support effect for each other.

Further, in one embodiment, as shown in FIG. 1, there are two bearings 30 that are respectively located at the two sides of the ring body 41; the ring body 41 is clamped between the two bearings 30; the outlets of some liquid guide holes 412 face the end face of one bearing 30; the outlets of the other liquid guide holes 412 face the end surface of the other bearing 30; and the liquid guide holes 412 corresponding to the same bearing 30 are uniformly distributed in a spaced manner along the circumferential direction of the ring body 41. During use, the bearings 30 located at the two sides of the ring body 41 can be lubricated by the refrigerant under the action of the corresponding liquid guide holes 412, thereby ensuring that the two bearings 30 are both effectively lubricated.

Specifically, when the liquid guide holes 412 on the ring body 41 include transition holes 4121 and liquid injection holes 4122, and the liquid injection holes 4122 penetrate the ring body 41, the bearings 30 located at the two sides of the ring body 41 described above can all be lubricated under the action of the liquid guide holes 412, thereby further improving the lubrication effect. Moreover, the bearings 30 located at the two sides of the ring body 41 can abut against the ring body 41 simultaneously; when the bearings 30 are supported by the bearing support 50 and the end cover 60, the ring body 41 may be fixed as well by the bearing support 50 and the end cover 60.

Further, in one embodiment, as shown in FIG. 1, the refrigerant lubricated bearing assembly 10 further comprises a bearing support 50 that sleeves the periphery of the bearing 30 and the liquid injection ring 40 and abuts against the outer side surface of the bearing 30; the bearing support 50 is provided with liquid inlets 51 in communication with the environment; and the liquid inlets 51 communicate with the liquid storage chamber 411.

During use, the refrigerant is introduced into the liquid storage chamber 411 through the liquid inlets 51. Specifically, the bearing support 50 sleeves the periphery of the bearing 30 to support the bearing 30. Them are a plurality of liquid inlets 51. The liquid inlets 51 is such configured that the axes of the liquid inlets 51 may be arranged along the radial direction of the bearing 30. Especially when the liquid storage chamber 411 is the annular groove, the diameter of the liquid inlets 51 is smaller than or equal to the axial width of the annular groove, thereby ensuring that the liquid inlets 51 can be used to introduce the refrigerant into the annular groove more reliably. If the bearing support 50 consists of two parts, namely the bearing 30 is clamped and fixed by the two parts, thus the liquid inlets 51 are symmetrically arranged in the two parts respectively to further improve the uniformity of liquid supply.

Further, in one embodiment, as shown in FIG. 1, the refrigerant lubricated bearing assembly 10 further comprises an end cover 60; the end cover 60 sleeves the transmission shaft 20 and is spaced from the transmission shaft 20; the bearing support 50 is axially divided into a first section 52 and a second section 53; the aperture of the first section 52 is larger than that of the second section 53; the inner diameter of the end cover 60 is smaller than that of the first section 52; the end face of the end cover 60 is connected with the end face of the first section 52 to form a clamping space 61 for fixing the ring body 41 and the bearing 30; the ring body 41 and the bearing 30 that abut against each other are installed inside the clamping space 61; the inner side surface of the first section 52 abuts against the outer side surface of the bearing 30; and the second section 53 and the transmission shaft 20 are arranged in a spaced manner.

The ring body 41 and the bearing 30 are fixed by a bearing support seat and the end cover 60, and the end cover 60 and the second section 53 are both spaced from the transmission shaft 20, so that the lubricating refrigerant introduced into the bearing 30 via the liquid inlets 51 and the liquid injection ring 40 may flow out from the axial direction of the transmission shaft 20 without additionally arranging a liquid outlet channel, thus the structure is further simplified. Namely, only the process that the refrigerant enters the bearing 30 is considered for the arrangement of the liquid injection ring 40 so as to ensure that the outlets of the plurality of liquid guide holes 412 in the ring body 41 are uniformly distributed in a spaced manner along the axial direction of the ring body 41, thereby ensuring the uniformity of lubrication and improving the lubrication effect.

Further, in one embodiment, as shown in FIG. 1, the inner side surface of the bearing support 50 abuts against the outer side surface of the ring body 41; the liquid inlets 51 are arranged corresponding to the liquid storage chamber 411; the ring body 41 and the transmission shaft 20 are arranged in a spaced manner; the end surface of the ring body 41 abuts against the outer ring of the bearing 30; and the ring body 41 and the inner ring of the bearing 30 are arranged in a spaced manner.

During use, the liquid injection ring 40 is a fixed part, so the ring body 41 and the transmission shaft 20 are arranged in a spaced manner, and the end surface of the ring body 41 abuts against the outer ring of the bearing 30 and is spaced from the inner ring of the bearing 30, namely the inner diameter of the ring body 41 is larger than the outer diameter of the transmission shaft 20, so that the transmission shaft 20 will not interfere with the ring body 41 during rotation. Specifically, the designed unilateral clearance between the inner side surface of the ring body 41 and the outer side surface of the transmission shaft 20 is 1 mm to 2 mm to avoid generation of interference between the liquid injection ring 40 and the transmission shaft 20 due to cumulative errors in a manufacturing process. The spaced arrangement of the ring body 41 and the inner ring of the bearing 30 may be achieved by setting the inner diameter of the ring body 41 to be larger than the outer diameter of the inner ring, or may be achieved by recessing the part, opposite to the inner ring, of the end surface of the ring body 41 into the ring body 41. In this way, the contact between the ring body 41 and the inner ring is avoided, and occurrence of rotation of the ring body 41 caused by interference between the ring body 41 and the inner ring during the rotation of the transmission shaft 20 is avoided.

Moreover, the inner side surface of the bearing support 50 abuts against the outer side surface of the ring body 41 to further support and fix the ring body 41, thereby preventing the ring body 41 from shaking in the bearing support seat, therefore, on one hand the uniformity of lubrication is not affected, and on the other hand the interference generated between the liquid injection ring 40 and the transmission shaft 20 is avoided. Besides, the liquid inlets 51 and the liquid storage chamber 411 are arranged correspondingly to ensure that the refrigerant may be introduced into the liquid storage chamber 411 via the liquid inlets 51.

All technical features of the above-mentioned embodiments can be combined randomly; in order to make the description concise, not all possible combinations of the various technical features in the above-mentioned embodiments are described, however, as long as there is no contradiction between the combinations of these technical features, all should be considered as the scope of this specification.

The above-mentioned embodiments only express several implementation modes of the present application, and the description thereof is relatively specific and detailed, but it should not be understood as a limitation to the patent scope of the present application. It should be noted that, for those of ordinary skill in the art, without departing from the concept of the present application, a plurality of modifications and improvements can be made as well, which all fall within the protection scope of the present application. Therefore, the protection scope of the present application depends on the claims described.

The invention claimed is:

1. A liquid injection ring, comprising a ring body, wherein the ring body is provided with a liquid storage chamber and a plurality of liquid guide holes;

the liquid storage chamber is arranged in a circle around an axis of the ring body; an inlet of each of the plurality of liquid guide holes communicates with the liquid storage chamber, and an outlet of each of the liquid guide holes faces an end surface of a to-be-lubricated bearing; and the liquid guide holes are uniformly distributed in a spaced manner along a circumferential direction of the ring body;

wherein each of the liquid guide holes comprises a transition hole and a liquid injection hole that communicate with each other; the transition hole is in communication with the liquid storage chamber;

the plurality of the transition holes are uniformly distributed in a spaced manner along the circumferential direction of the ring body;

the outlet of each of the liquid guide holes is formed by the liquid injection holes the plurality of the liquid injection holes are uniformly distributed in a spaced manner along the circumferential direction of the ring body;

and the diameter of the plurality of liquid injection holes is smaller than that of the transition holes;

wherein each liquid injection hole penetrates through the ring body and forms two of the outlets respectively in two end faces of the ring body, and the outlets located in the same end face of the ring body are uniformly distributed in a spaced manner along the circumferential direction of the ring body, and wherein the volume of the liquid storage chamber is greater than or equal to the sum of the volumes of all transition holes and all liquid injection holes, and the volume of each transition hole is greater than or equal to that of the corresponding liquid injection hole.

2. The liquid injection ring according to claim 1, wherein the liquid storage chamber is an annular groove which is formed in an outer side surface of the ring body.

3. The liquid injection ring according to claim 1, wherein there are 4-8 liquid guide holes.

4. A refrigerant lubricated bearing assembly, comprising a transmission shaft, a bearing, and the liquid injection ring according to claim 1, wherein the bearing and the ring body both are sleeved on the transmission shaft;
   an end surface of the ring body abuts against the end surface of the to-be-lubricated bearing; and
   the outlets of the plurality of liquid guide holes face the bearing.

5. The refrigerant lubricated bearing assembly according to claim 4, wherein the bearing comprises two bearings, wherein the two bearings are respectively located at the two sides of the ring body;
   the ring body is clamped between the two bearings;
   a plurality of outlets of some of the plurality of liquid guide holes face an end face of one of the two bearings;
   the plurality of outlets of the other liquid guide holes face an end surface of the other bearing; and
   the plurality of liquid guide holes corresponding to the same bearing are uniformly distributed in a spaced manner along the circumferential direction of the ring body.

6. The refrigerant lubricated bearing assembly according to claim 4, further comprising a bearing support, wherein the bearing support is sleeved on a periphery of the bearing and the liquid injection ring and abuts against an outer side surface of the bearing;
   the bearing support is provided with a liquid inlet communicating with an environment; and
   the liquid inlet communicates with the liquid storage chamber.

7. The refrigerant lubricated bearing assembly according to claim 6, wherein there are a plurality of the liquid inlets.

8. The refrigerant lubricated bearing assembly according to claim 6, further comprising an end cover, wherein the end cover is sleeved on a transmission shaft and is spaced from the transmission shaft;
   the bearing support is axially divided into a first section and a second section;
   an aperture of the first section is larger than that of the second section;
   an inner diameter of the end cover is smaller than that of the first section;
   an end face of the end cover is connected with an end face of the first section to form a clamping space for fixing the ring body and the bearing;
   the ring body and the bearing that abut against each other are installed inside the clamping space;
   an inner side surface of the first section abuts against the outer side surface of the bearing; and
   the second section and the transmission shaft are arranged in a spaced manner.

9. The refrigerant lubricated bearing assembly according to claim 6, wherein the bearing is a deep groove ball bearing;
   an inner side surface of the bearing support abuts against an outer side surface of the ring body;
   the liquid inlet is arranged corresponding to the liquid storage chamber;
   the ring body and the transmission shaft are arranged in a spaced manner;
   the end surface of the ring body abuts against an outer ring of the bearing; and
   the ring body and an inner ring of the bearing are arranged in a spaced manner.

\* \* \* \* \*